Figure 1:
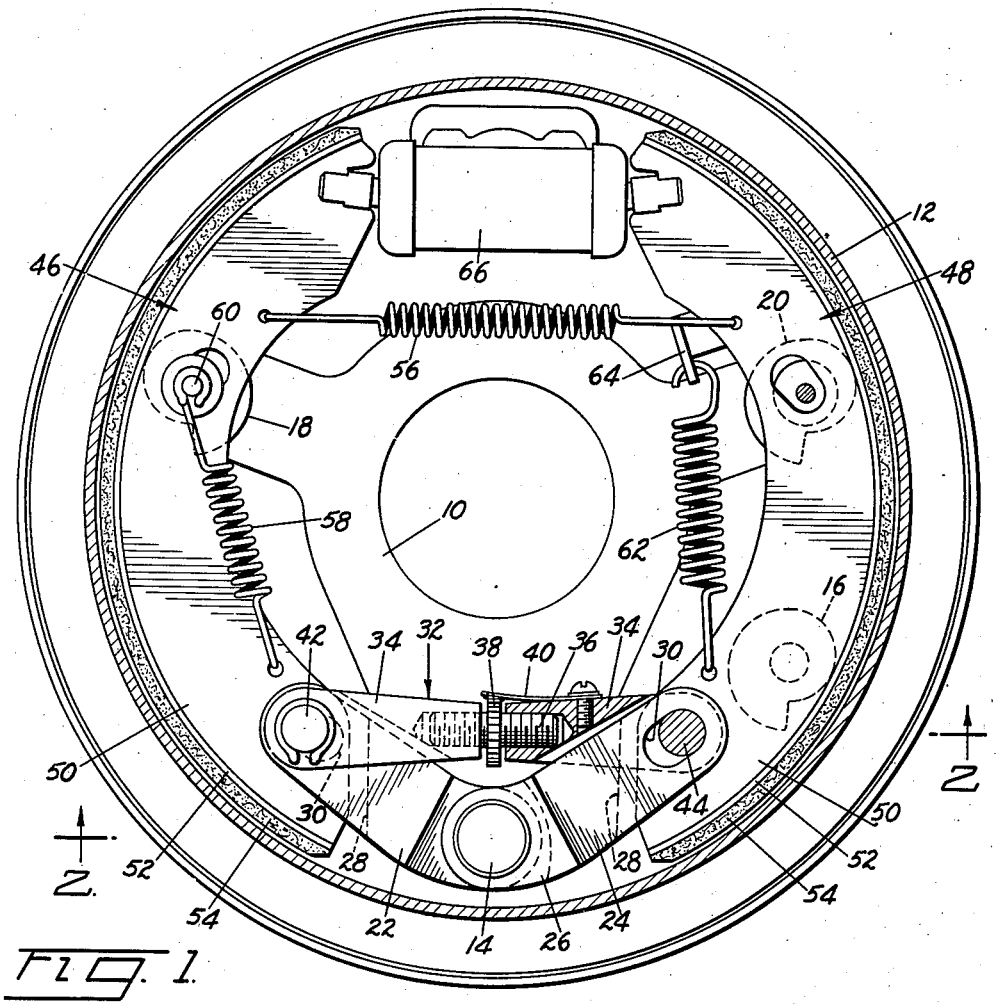

March 24, 1942.   A. A. LOWEKE   2,277,335
BRAKE
Filed Dec. 27, 1938

INVENTOR.
AARON A. LOWEKE
BY
ATTORNEY.

Patented Mar. 24, 1942

2,277,335

UNITED STATES PATENT OFFICE 2,277,335

BRAKE

Aaron A. Loweke, Detroit, Mich., assignor to Hydraulic Brake Company, Detroit, Mich., a corporation of California Application December 27, 1938, Serial No. 247,959

13 Claims. (Cl. 188—78)

This invention relates to brakes, and more particularly to internal expanding brakes for motor vehicles.

Broadly the invention comprehends a brake structure including a fixed support or backing plate, a rotatable drum associated therewith, a pair of links pivoted on the backing plate each having a slot in its free end, an adjustable link having mounted in each of its ends a pivot pin received by the slots in the links, a pair of corresponding interchangeable friction elements or shoes mounted on the pivot pins for cooperation with the drum, and a motor for actuating the shoes.

An object of the invention is to provide a brake structure wherein the trailing or reverse frictional element may be more effectively applied.

Another object of the invention is to provide a brake structure wherein force is transmitted from the forward frictional element to the trailing frictional element in both forward and reverse braking.

Another object of the invention is to provide a brake structure wherein the heels of the frictional elements are so anchored and connected that the braking force may be equalized at the heels of the frictional elements so as to increase the effectiveness of the brake as a whole.

Another object of the invention is to provide a brake structure having a simple and effective anchor means for the frictional elements, and means for effectively adjusting the heels of the frictional elements outwardly and downwardly.

A feature of the invention is a single anchor having pivoted thereon corresponding links provided with slots for the reception of pins mounted in the respective ends of an adjustable link, and a pair of corresponding friction elements pivotally mounted on the pins.

Other objects and features of the invention will appear from the following description taken in connection with the drawing forming a part of this specification, and in which—

Figure 2:
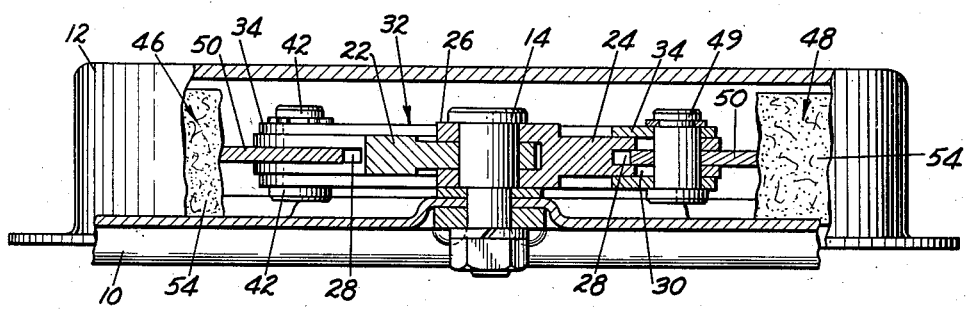

Fig. 1 is a vertical sectional view of a brake taken just back of the head of the drum, showing the friction elements or shoes and motor in elevation, and illustrating the invention as applied; and Fig. 2 is a cross-sectional view taken substantially on line 2—2, Fig. 1.

Referring to the drawing for more specific details of the invention, 10 represents a fixed support or backing plate, and 12 a rotatable drum associated with the backing plate. Suitably arranged on the backing plate is an anchor 14, a retractile stop 16, and a pair of combined retractile stops and guides 18 and 20.

A pair of links 22 and 24 are pivotally mounted on the anchor 14. As shown, the adjacent or pivoted ends of the links are constructed to provide a clevis 26 so that the longitudinal axes of the respective links may be in a plane common to both, and the free ends of the links are provided with longitudinal slots 28 in the axes of the links and transverse slots 30.

An adjustable link indicated generally at 32 includes corresponding yoke members 34 connected by a right and left-hand screw 36 having thereon substantially centrally of its length a star wheel 38 normally held against movement by a spring 40 mounted on one of the yoke members, and pivot pins 42 and 44 suitably mounted in the yokes are received by the transverse slots 30 in the respective links 22 and 24.

A pair of corresponding interchangeable friction elements or shoes 46 and 48 are mounted on the backing plate for cooperation with the drum. Each of the shoes includes a web 50 supporting a rim 52 having suitably secured thereon a friction lining 54.

The articulate ends of the shoes are mounted on the pivot pins 42 and 44 in the longitudinal slots 30 of the respective links. The webs of the shoes are slotted for the reception of the guides on the retractile stops 18 and 20, and when the shoes are at rest or in retracted position they are supported by the retractile stops 16, 18 and 20 in proper spaced relation to the drum.

The shoes 46 and 48 are connected by a retractile spring 56, the shoe 46 is connected by a spring 58 to a post 60 on the retractile stop 18, and the shoe 48 is connected by a spring 62 to a fixed support 64 suitably arranged on the backing plate. The spring 56 serves to return the shoes to their retracted position upon conclusion of a braking operation, and the springs 58 and 62 serve to raise the shoes so as to seat the pivot pins 42 and 44 in the extreme outer ends of the slots 30. The spring 62 also serves to yieldingly hold the shoe 48 against the retractile stop 16.

A fluid pressure actuated motor 66 of conventional type is suitably mounted on the backing plate and connected to the force-applying ends of the shoes 46 and 48, and this motor is operative to actuate the shoes into engagement with the drum against the resistance of the retractile spring 56. In a forward braking operation, upon energization of the motor 66, the shoes 46 and 48 are moved from their retracted position against the retractile stops 16, 18 and 20 into engagement with the drum 12 against the resistance of the retractile springs 56, 58 and 62 to effectively retard rotation of the drum.

When the shoe 46 engages the drum 12, due to the wiping action thereof the shoe is slightly rotated. This movement of the shoe transmits force through the link 32 to the shoe 48, resulting in this shoe swinging on its pivot pin 44, and concomitantly therewith the link 24 swings on the anchor 14. Accordingly, the braking force is equally distributed between the shoes 46 and 48.

In a reverse braking operation, the shoe 48 becomes the forward braking shoe and the shoe 46 the trailing or reverse braking shoe. Accordingly, a reverse braking operation is the reverse of that hereinabove described in connection with forward braking.

While this invention has been described in connection with certain specific embodiments, the principle involved is susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is:

1. A brake comprising a fixed support, a rotatable drum associated therewith, a pair of friction elements for cooperation with the drum, an anchor on the support, a pair of links pivotally mounted on the anchor, an adjustable link connecting the friction elements, means shiftably connecting the friction elements to the links, and means for actuating the friction elements.

2. A brake comprising a fixed support, a rotatable drum associated therewith, a pair of links pivoted on the support, a pair of friction elements shiftably connected to the links for cooperation with the drum, an adjustable link connecting the friction elements adjacent their articulate ends, and means for actuating the friction elements.

3. A brake comprising a fixed support, a rotatable drum associated therewith, a pair of friction elements for cooperation with the drum, an anchor on the support, independently pivotal means connecting the friction elements to the anchor including means providing for full floating action of the forward friction element and transmission of force therefrom to the trailing friction element in both forward and reverse braking, and means for actuating the friction elements.

4. A brake comprising a fixed support, a rotatable drum associated therewith, a pair of friction elements for cooperation with the drum, an anchor on the support, means connecting the friction elements to the anchor operative in both directions of braking to provide for full floating action of one of the friction elements, anchorage of the other friction element, and for transmission of force from the floating element to the anchored element so as to equalize the force between both elements, and means for actuating the elements, said means connecting the friction elements to the anchor being adjustable to vary the spread of its points of connection with the friction elements.

5. A brake comprising a fixed support, a rotatable drum associated therewith, an anchor on the support, a pair of links pivoted on the anchor having slots in their free ends, an adjustable member having pins in its ends slidable in the slots, friction elements pivoted on the pins for cooperation with the drum, and means for actuating the friction elements.

6. A brake comprising a fixed support, a rotatable drum associated therewith, a pair of friction elements, means for anchoring the elements on the support for cooperation with the drum so that in both directions of braking one of the elements has full floating action and imparts force received radially on the anchored end of the other element, and means for actuating the elements, said means for anchoring the elements on the support including an anchor fixed to the support and mechanism coupling said anchor with the adjacent ends of the elements to position the elements, said mechanism including means coupling the adjacent and anchoring ends of the elements together to transmit braking force from one element to the other.

7. A brake comprising a fixed support, a rotatable drum associated therewith, a pair of friction elements, means for anchoring the elements on the support for cooperation with the drum so that in both forward and reverse braking the forward friction element has full floating action and transmits force to the other element and the articulate ends of both elements are swung into the drum, and means for actuating the elements, said means for anchoring the elements on the support including an anchor fixed to the support and mechanism coupling the adjacent end of each element to the anchor to anchor the element thereupon and coupling the adjacent ends of the elements together to transmit braking force from either element to the other element.

8. A brake comprising a fixed support, an anchor on the support, a rotatable drum, a pair of friction elements, and means pivotally coupling each element with the anchor to position the element with respect thereto and means pivotally coupling the anchored ends of the two elements together within the radius of the anchor to transmit braking force from one element to the other.

9. A brake comprising a fixed support, a rotatable drum, a pair of friction elements for cooperation with the drum, mechanism for actuating the friction elements, and means pivotally anchoring each brake element upon the support and adapted to permit floating movement of the friction elements, said means including mechanism located within the radius of the pivotal anchorage connecting the anchored ends of the friction elements for transmitting braking force from either element to the other.

10. A brake comprising a fixed support, a rotatable drum, a pair of friction elements cooperating with the drum, means for actuating the friction elements, a pair of links pivoted to the support and having their free ends coupled to the adjacent ends of the friction elements to assist in positioning them with respect to the support and to permit floating movement of each element with respect thereto, and means connecting the free ends of the links and anchored ends of the friction elements to transmit braking force from one element to the other.

11. A brake comprising a fixed support, a rotatable drum, a pair of friction elements cooperating with the drum, means for actuating the friction elements, a pair of links pivoted to the support and having their free ends oppositely directed and coupled with the friction elements to assist in positioning them with respect to the support and to permit floating movement of either element, and adjustment means connecting the free ends of said links and adjustable to vary the spread thereof, said adjustment means operable to transmit force from one friction element to the other friction element being located radially inward from the pivoting position of the links.

12. A brake comprising a fixed support, a rotatable drum, a pair of friction elements cooperating with the drum, actuating means operable to spread one pair of ends of the friction elements apart, linkage cooperating with the opposite pair of ends of the friction elements coupling each of said ends with the support while permitting relative movement of each friction element with respect to said linkage, and mechanism coupling said last-mentioned pair of ends of the friction elements together to transmit braking effort from one element to the other, said mechanism cooperating directly with said linkage to assist in positioning the friction elements.

13. A brake comprising a fixed support, a rotatable drum, a pair of friction elements cooperating with the drum, actuating means for urging the friction elements toward the drum, a pair of links pivoted to the drum and having their free ends oppositely directed toward the friction elements, and an adjustment device operable to transmit force from one friction element to the other friction element connecting the free ends of said links together, opposite ends of said adjustment device and the free ends of said links being coupled with the adjacent ends of the two friction elements, said adjustment device being radially inward from the pivoting position of the links on the drum.

AARON A. LOWEKE.